(12) United States Patent
Kawamura et al.

(10) Patent No.: US 9,893,575 B2
(45) Date of Patent: Feb. 13, 2018

(54) PERMANENT-MAGNET-EMBEDDED ELECTRIC MOTOR AND METHOD FOR MANUFACTURING SAME

(71) Applicant: Panasonic Intellectual Property Management Co., Ltd., Osaka (JP)

(72) Inventors: Kiyomi Kawamura, Osaka (JP); Hiroaki Kawasaki, Osaka (JP); Yuichi Yoshikawa, Osaka (JP); Yasushi Kato, Kyoto (JP); Haruhiko Kado, Osaka (JP); Noritaka Aso, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 266 days.

(21) Appl. No.: 14/778,575

(22) PCT Filed: Mar. 20, 2014

(86) PCT No.: PCT/JP2014/001619
§ 371 (c)(1),
(2) Date: Sep. 18, 2015

(87) PCT Pub. No.: WO2014/156090
PCT Pub. Date: Oct. 2, 2014

(65) Prior Publication Data
US 2016/0285326 A1  Sep. 29, 2016

(30) Foreign Application Priority Data

Mar. 25, 2013  (JP) .................... 2013-061415
Jun. 14, 2013  (JP) .................... 2013-125357

(51) Int. Cl.
*H02K 21/12*  (2006.01)
*H02K 1/27*  (2006.01)
(Continued)

(52) U.S. Cl.
CPC ............ *H02K 1/2706* (2013.01); *H02K 1/02* (2013.01); *H02K 1/14* (2013.01); *H02K 1/16* (2013.01);
(Continued)

(58) Field of Classification Search
CPC ................. H02K 1/16; H02K 21/14
(Continued)

(56) References Cited

U.S. PATENT DOCUMENTS

2004/0150282 A1 * 8/2004 Murakami ............ H02K 1/246
310/156.53
2011/0050022 A1 3/2011 Li et al.
(Continued)

FOREIGN PATENT DOCUMENTS

JP  7-336918  12/1995
JP  9-289745  11/1997
(Continued)

OTHER PUBLICATIONS

Machone translation JP2011114927 (2011).*
International Search Report of PCT application No. PCT/JP2014/001619 dated Jun. 3, 2014.

*Primary Examiner* — Jose Gonzalez Quinones
(74) *Attorney, Agent, or Firm* — Hamre, Schumann, Mueller & Larson, P.C.

(57) ABSTRACT

A permanent-magnet-embedded electric motor includes a stator having a coil wound on a stator core, and a rotor disposed rotatably inside the stator through a gap to an inner circumferential surface of the stator core. The rotor is provided with a rotor core formed of laminated steel plates having a plurality of magnet-embedding holes, and a permanent magnet housed and retained in each of the magnet-embedding holes. A thickness of the bridge portions formed between edges of the magnet-embedding holes and an outer circumference of the rotor core, and a thickness of a thinned link portion connecting adjoining two of the bridge portions are thinner than a thickness of the steel plates.

14 Claims, 5 Drawing Sheets

(51) Int. Cl.
  *H02K 1/02*  (2006.01)
  *H02K 1/14*  (2006.01)
  *H02K 1/16*  (2006.01)
  *H02K 3/12*  (2006.01)
  *H02K 15/03*  (2006.01)

(52) U.S. Cl.
  CPC ............... *H02K 1/276* (2013.01); *H02K 3/12* (2013.01); *H02K 15/03* (2013.01); *H02K 2213/03* (2013.01)

(58) Field of Classification Search
  USPC ............. 310/156.01, 156.19, 156.21–156.23
  See application file for complete search history.

(56) References Cited

U.S. PATENT DOCUMENTS

2013/0334910 A1* 12/2013 Takahashi ................ H02K 9/22
  310/52
2016/0285326 A1  9/2016 Kawamura et al.

FOREIGN PATENT DOCUMENTS

| | | |
|---|---|---|
| JP | 2005-130604 | 5/2005 |
| JP | 2006-050821 | 2/2006 |
| JP | 2007-110880 | 4/2007 |
| JP | 2011-114927 | 6/2011 |
| JP | 2011114927 A * | 6/2011 |
| JP | 2016-007136 | 1/2016 |
| WO | 2008/139675 | 11/2008 |
| WO | 2012/137430 | 10/2012 |

* cited by examiner

PERMANENT-MAGNET-EMBEDDED ELECTRIC MOTOR AND METHOD FOR MANUFACTURING SAME

CROSS-REFERENCE TO RELATED APPLICATIONS

This application is a U.S. national stage application of the PCT International Application No. PCT/JP2014/001619 filed on Mar. 20, 2014, which claims the benefit of foreign priority of Japanese patent applications 2013-061415 filed on Mar. 25, 2013 and 2013-125357 filed on Jun. 14, 2013, the contents all of which are incorporated herein by reference.

TECHNICAL FIELD

The present invention relates to a permanent-magnet-embedded electric motor having a permanent-magnet-embedded rotor constructed of a plurality of permanent magnets embedded in a rotor core at predetermined intervals, and the invention also relates to a method for manufacturing the same.

BACKGROUND ART

Certain arts such as those described in Patent Literatures 1 and 2 have been known in this technical field.

Patent Literature 1 discloses a rotor having a rotor core of approximately cylindrical shape with a plurality of permanent magnet holes formed in a circumferential direction, and permanent magnets disposed into a shape of letter V in each of the magnet holes, wherein a thickness in an axial direction of a bridge portion formed between an outer edge in a radial direction of each of the magnet holes and an outer circumference is thinner than other parts.

Patent Literature 2 discloses a rotor core steel plate provided with a magnet slot that houses a magnet inside an outer circumferential edge, and that a bridge portion between the magnet slot and the outer circumferential edge has a flattened section which provides a compressive residual stress.

Although the above-referred conventional structures are intended to reduce magnetic flux leakage by making the thickness of the bridge portions smaller than the other parts, they cannot attain sufficient reduction of the magnetic flux leakage since the structures do not cover the entire magnetic leakage paths.

CITATION LIST

Patent Literatures

PTL 1: Japanese Patent Unexamined Publication, No. 2006-50821
PTL 2: International Publication, No. 2012/137430

SUMMARY OF THE INVENTION

A permanent-magnet-embedded electric motor of the present invention has the following structure. That is, the motor includes a stator having a coil wound on a stator core, and a rotor disposed rotatably inside the stator via a gap to an inner circumferential surface of the stator core.

The rotor is provided with a rotor core formed of laminated steel plates having a plurality of magnet-embedding holes, and a permanent magnet housed and retained in each of the magnet-embedding holes.

The steel plates have bridge portions, each formed between edges of the magnet-embedding holes and an outer circumference of the steel plates, and a plate thickness of the bridge portions is formed thinner than a plate thickness of parts other than the bridge portions. In addition, adjoining bridge portions are connected with a thinned link portion having a plate thickness thinner than the plate thickness of parts other than the bridge portions.

A magnetic flux produced by the permanent magnet passes through the bridge portions and flows to the adjoining permanent magnet, and a magnetic resistance in the entire magnetic path does not increase even when the plate thickness of only the bridge portions are reduced. Therefore, a reduction of the magnetic flux leakage can be achieved by connecting the bridge portions with the thinned link portion, which decrease the plate thickness of the bridge portions in a manner to increase the magnetic resistance in the entire magnetic path.

DESCRIPTION OF EMBODIMENTS

Description is provided hereinafter of an exemplary embodiment of the present invention by referring to the accompanying drawings. Note that the following embodiment shall not be construed as limiting the scope of the present invention.

Figure 1:
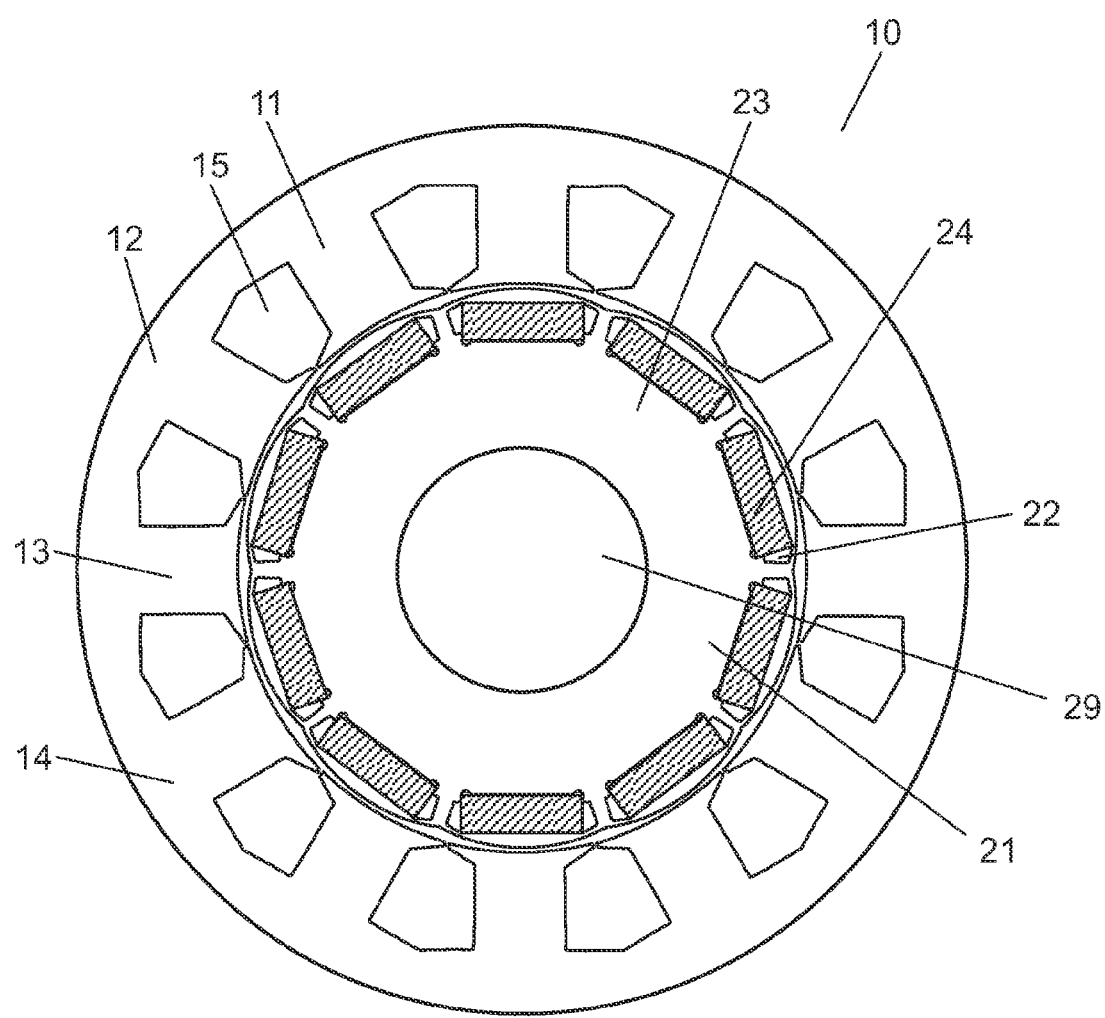
FIG. 1 is a cross sectional view of a permanent-magnet-embedded electric motor according to an exemplary embodiment of the present invention.

FIG. 1 is a cross sectional view taken along a plane perpendicular to a center axis of rotation of permanent-magnet-embedded electric motor 10 according to the exemplary embodiment of this invention.

Electric motor 10 according to this embodiment is provided with stator 11 and rotor 21. Stator 11 includes stator core 14 made by laminating a plurality of thin steel plates, and a coil (not shown) wound on stator core 14. Stator core 14 has yoke 12, a plurality of teeth 13 formed along an inner circumference side of yoke 12, and a plurality of slots 15, each formed between adjoining teeth 13. The coil is wound on stator core 14 into either concentrated winding or distributed winding, and placed in slots 15.

Rotor 21 includes rotor core 23 having a plurality of magnet-embedding holes 22 formed at predetermined intervals along a circumferential direction, permanent magnets 24 embedded individually in magnet-embedding holes 22, and rotor shaft 29 disposed in a center of rotor core 23. Rotor core 23 is constructed by laminating in an axial direction a plurality of thin iron plates, i.e., the steel plates provided with magnet-embedding holes 22 formed in them. In addition, permanent magnets 24 that form magnetic poles of rotor 21 are housed and retained in the individual magnet-embedding holes 22. Permanent magnets 24 are either fixed by being sandwiched between upper and lower end plates, or bonded with a resin, adhesive or the like material. Rotor core 23 is supported rotatably with a bearing (not shown) through rotor shaft 29.

Rotor 21 constructed as above confronts an inner circumferential surfaces of teeth 13 of stator 11 through an air gap.

Note that FIG. 1 shows an example in which a number of poles of rotor 21 is ten (10), and a number of slots of stator 11 is twelve (12). However, the present invention is not limited to this combination, and the invention is also applicable to other combinations.

Furthermore, although permanent magnets 24 in this example show a flat-plate shape, there is not a limitation to this shape, as such that permanent magnets of any other shape like letter U, letter V, semi-cylindrical, and the like can also be applied. Also applicable is a material of the permanent magnets such as neodymium sintered magnets, neodymium bonded magnets, ferrite sintered magnets, ferrite bonded magnets, or any other material.

Figure 2A:
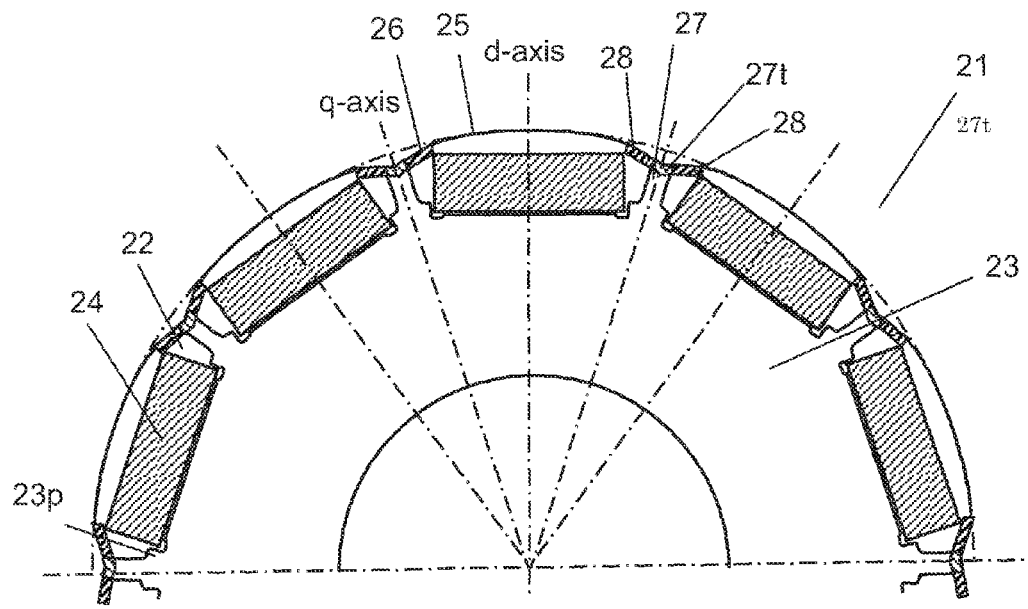
FIG. 2A is an enlarged view of a main part of a rotor of the permanent-magnet-embedded electric motor.
Figure 2B:
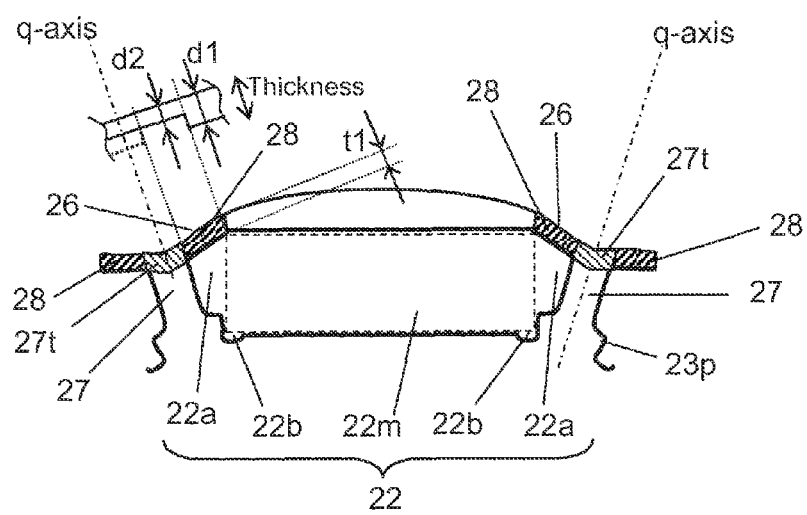
FIG. 2B is another view of the rotor, of which an area around a magnet-embedding hole is further enlarged.

FIG. 2A is an enlarged sectional view taken along a plane perpendicular to the center axis of rotation of rotor 21. FIG. 2B is another view, in which magnet-embedding hole 22 and an adjacent area of rotor 21 are further enlarged. In FIG. 2B, magnet-embedding hole 22 is shown without permanent magnet 24 embedded.

In FIG. 2A, magnet-embedding holes 22 have a shape that is slightly larger than a sectional area of permanent magnets 24 to be inserted. In other words, magnet-embedding holes 22 have such a sectional shape that includes magnet-housing space 22m, first gaps 22a at both sides, and second gaps 22b at both sides, as shown in FIG. 2B. Here, magnet-housing space 22m is an area where permanent magnet 24 is housed. First gaps 22a are formed at both ends in the circumferential direction of magnet-embedding hole 22, and are spaces where permanent magnet 24 does not occupy. Second gaps 22b are gaps formed near the both ends at the inner side in the radial direction of magnet-embedding hole 22.

Permanent magnets 24 are positioned by means of protrusions 23p formed at boundaries between first gaps 22a and second gaps 22b. In addition, permanent magnets 24 are mechanically secured to magnet-embedding holes 22 with end plates, or bonded with an adhesive, resin or the like.

A straight line connecting between the center of rotation of rotor 21 and the center of a magnetic pole, i.e., the center of one of permanent magnets 24, is designated as d-axis, and another straight line connecting between the center of rotation and a midpoint of two adjoining permanent magnets 24 is designated as q-axis. The outer circumferential surface of rotor 21 is formed of first curved sections 25 that face near the center parts of the individual permanent magnets 24 and have radius R1 from the center of the rotor, and second curved sections 26 that connect first curved sections 25 and the q-axes. Radius R2 of second curved sections 26 is configured to be smaller than radius R1 of the first curved sections. The second curved sections may be formed of straight lines, or only of the first curved sections may be used without providing the second curved sections (that is, the outer circumferential surface is formed of a single circle).

In addition, the thin iron plates of rotor core 23 have bridge portions 28 of width t1 in the radial direction formed between the ends of magnet-embedding holes 22 and the outer circumference of the thin iron plates, that is, between first gaps 22a and second curved section 26. There are also link portions 27 formed as parts of the iron plates between the adjoining magnet-embedding holes.

These bridge portions 28 have plate thickness d2 that is thinner than plate thickness d1 of other parts (that is, plate thickness d1 of the thin iron plates), illustrated as thicknesses in FIG. 2B. Here, bridge portions 28 are thinned down by having the thin iron plates flattened with a pressing machine. This pressing work may be made on only one side, or both sides of the thin iron plates. In addition, bridge portions 28 that adjoin each other across q-axis are connected with each of thinned link portions 27t configured to connect these adjoining bridge portions 28. Thinned link portion 27t is a part of link portion 27, and a plate thickness of thinned link portion 27t is also thinner than thickness d1 of portions other than bridge portions 28. Although bridge portions 28 and thinned link portions 27t preferably have the same plate thickness, they need not be expressly the same.

On the other hand, the structure is desirably configured so that the magnetic fluxes produced by permanent magnets 24 concentrate in the centers of the magnetic poles by reducing magnetic flux leakages that flow toward interpolar spaces (i.e., the q-axis directions) as much as possible, in order to achieve a high torque of electric motor 10.

The magnetic flux leakages flowing toward the interpolar spaces include magnetic fluxes that flow into adjoining permanent magnets 24 by passing through bridge portions 28. Such paths of the magnetic fluxes include link portions 27. Here, a magnetic resistance of link portions 27 is smaller as compared to bridge portions 28 because link portions 27 are larger in both thickness and area than bridge portions 28. In other words, the magnetic resistance of the magnetic paths as a whole does not increase even when the plate thickness of only bridge portions 28 is thinned down to such a thickness as d2 to increase the magnetic resistance of the portions, since each of the magnetic paths is connected through one of link portions 27 where the magnetic resistance is small.

Thinned link portions 27t where the plate thickness is thinned down are therefore provided in this embodiment so that the magnetic resistance increases even in link portions 27 included in the magnetic paths. The adjoining bridge portions 28 are then connected with each other through such thinned link portion 27t. The magnetic resistance in the entire magnetic paths can be increased by making the plate thickness of bridge portions 28 and thinned link portions 27t thinner than the thickness of the thin iron plate, which can suppress flow of the magnetic fluxes toward the interpolar spaces, thereby achieving a reduction of the magnetic flux leakages.

Figure 3:
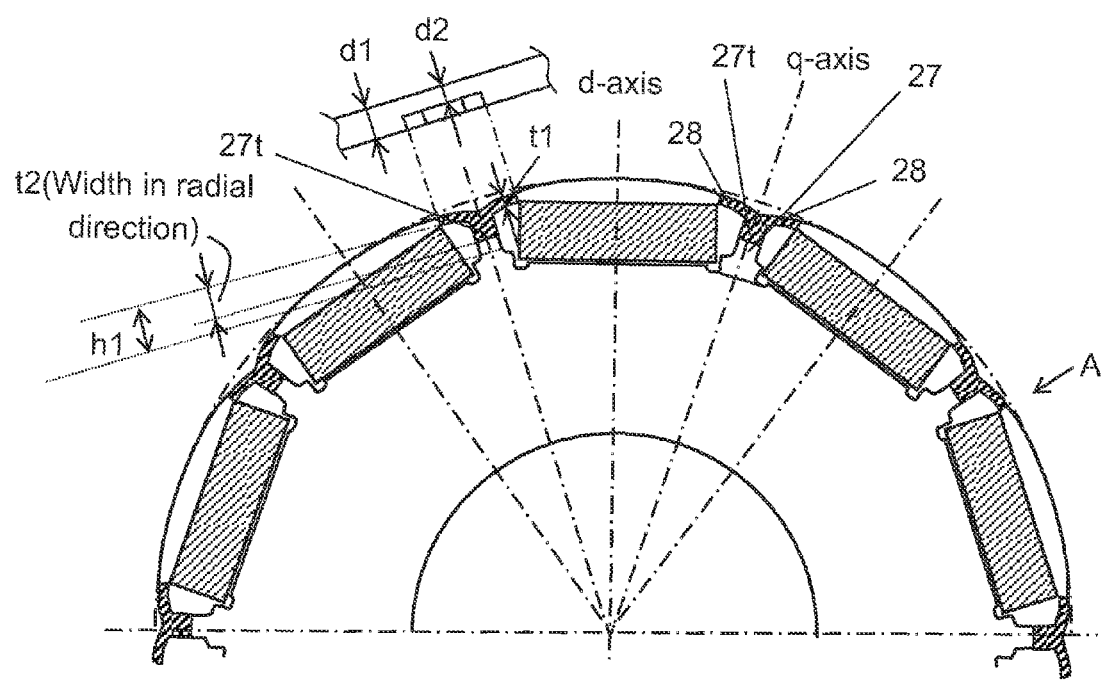
FIG. 3 is an enlarged view of a main part of a rotor of a permanent-magnet-embedded electric motor according to another exemplary embodiment of the present invention.

FIG. 3 shows another mode of thinned link portions 27t in FIG. 2A, wherein link portions 27t are formed to have larger width t2 in the radial direction by extending them to areas in link portions 27 close to the center on the side faces of permanent magnets 24.

When a focus is placed on the width in the radial direction of such interpolar spaces, the magnetic resistance decreases for the reason that width h1 of link portions 27 becomes larger than width t1 of bridge portions 28 when the magnetic fluxes flow toward adjacent permanent magnet 24 through bridge portions 28. In the structure of FIG. 3, therefore, width t2 in the radial direction of thinned link portions 27t is made larger than width t1 in the radial direction of bridge portions 28. That is, the magnetic resistance in link portions 27 is increased and the magnetic flux leakages are reduced by increasing an area of thinned link portions 27*t* where the plate thickness is thinned down.

There are also magnetic fluxes that leak toward parts of the core on the q-axes by passing through the gaps (i.e., first gaps 22*a*) provided on the side surfaces of permanent magnets 24, as the magnetic flux leakages that flow toward the interpolar spaces. Therefore, width t2 in the radial direction of thinned link portions 27*t* is further increased to also increase the magnetic resistance to the magnetic fluxes that leak through the gaps, thereby resulting in a further reduction of the magnetic fluxes leaking through the gaps.

In addition, the magnetic fluxes in the q-axes can be decreased by reducing the thickness of the thin iron plate in the areas on the q-axes. It hence becomes possible to construct the rotor of a small reluctance torque, or small pulsation in the torque, even of the magnet-embedded electric motor.

Figure 4A:
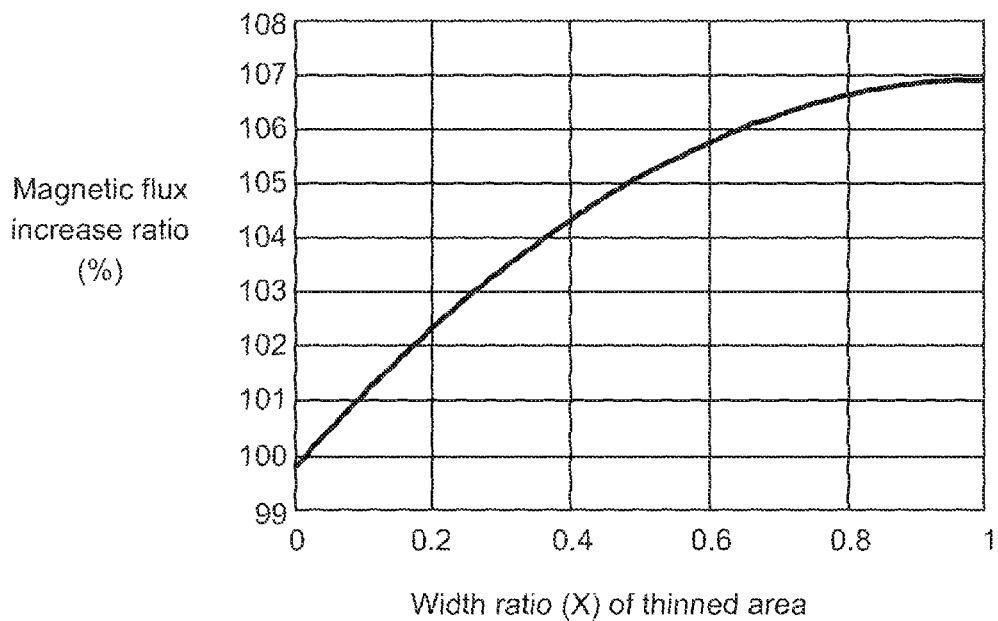
FIG. 4A is a graphic chart showing a relationship between ratio X of thinned area and increase ratio of magnetic flux.
Figure 4B:
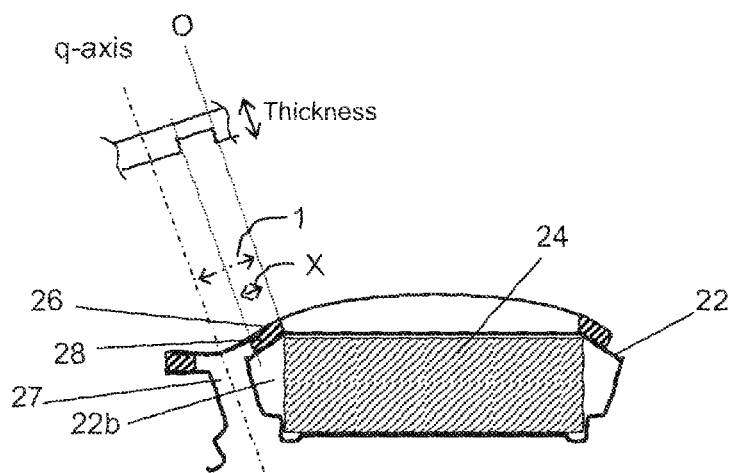
FIG. 4B is an illustration showing the ratio X of the thinned area.

FIG. 4A shows a relationship between range of thinned plate thickness formed with bridge portions 28 and thinned link portion 27*t* and amount of increase in the produced magnetic flux. The horizontal axis represents ratio in width of thinned area, in which a width of the thinned area taken orthogonally from O-line toward the q-axis is shown as ratio X (from 0 to 1), with respect to the full width from the O-line to the q-axis as being 1 (one). It is apparent, as shown in FIG. 4A, that increase ratio of the magnetic flux rises when the thicknesses of not only the bridge portions but also the thinned link portion in the link portion are thinned down.

Next, the relationship between plate thickness d2 of bridge portion 28 and width t1 in the radial direction of bridge portion 28 is set to be d2≤t1. It is believed in general that the minimum width for punching out a steel plate is desirably not less than a thickness of the steel plate, such that any width less than that is liable to cause distortion and deflection, which have an influence upon characteristics and accuracy of the electric motor. Moreover, the reduction of width t1 of bridge portions 28 can decrease the magnetic flux leakage that flows toward adjoining permanent magnet 24 by passing through bridge portions 28, and improve the characteristics of the electric motor. In other words, although the smaller in width t1 the more preferable in view of reducing the magnetic flux leakage, it is limited to the thickness of the steel plate from a standpoint of the punching process of the steel plate.

According to the present invention, therefore, a punching step of magnet-embedding holes 22 is carried out after bridge portions 28 are formed in a pressing step, for instance, so that the smallest width portions to be punched out are flattened prior to subjecting them to the punching step. In other words, the plate thickness d2 of bridge portions 28 is reduced first, so that the width t1 can also be reduced, thus making the above-stated condition of d2≤t1 possible.

That is, if the pressing step is carried out after the punching step, the width t1 of bridge portions 28 remains to be t1≥d1 when the plate thickness is d1 before being flattened. According to the present invention, however, the width t1 can be reduced to less than the thickness d1 before being flattened since it is thinned down to thickness d2 (i.e., d2≤d1), thereby achieving a reduction of the magnetic flux leakage to the minimum possible value.

As described here, according to a method for manufacturing a permanent-magnet-embedded electric motor of the present invention, a punching step of magnet-embedding holes 22 is carried out after a pressing step, in a process of forming a steel plate having the plurality of magnet-embedding holes 22, so that width t1 of bridge portions 28 can be formed into the smallest possible width that does not pose any problem in physical strength attributed to the pressing step of thinning down bridge portions 28. Since this width t1 can be formed into the smallest width, it becomes possible to reduce the magnetic flux leakage to the minimum value, and it can hence achieve improvement of the characteristics of the electric motor.

In particular, the present invention is useful for a relatively small electric motor since a dimension in width t1 of bridge portions 28 is determined by the smallest width that can be punched out regardless of mechanical strength.

Next, rotor 21 is constructed by punching a thin iron plate into sheet forms, and the sheets are then laminated while being turned one after another at a rate of any given angle. When the step of thinning down is applied in a direction of the plate thickness, a ratio of extension in the radial direction becomes different depending on an orientation of the plate material. This causes variations in the shape depending on the turning direction, which results in a substantial reduction of cogging torque that becomes the main cause of vibration and noise. In this embodiment, the thin iron plate is flattened in the direction of the plate thickness, and the sheets are then laminated while being turned at the rate of such an angle that brings magnet-embedding holes 22 match with one another, in order to avoid such a drawback as described here. Rotor 21 constructed by including such processes can cancel out the variations in the magnetic characteristics attributed to differences in dimension of the outer diameters and grain orientations from one another, thereby making it possible to reduce the cogging torque.

When rotor 21 rotates, a centrifugal force is produced. The centrifugal force causes permanent magnets 24 to abut against the circumferential side of the rotor, and produces stresses to concentrate locally on the bridge portions that hold parts of the core on the outer circumferential side of permanent magnets 24. According to this embodiment, on the other hand, permanent magnets 24 are secured with a resin, or the like material filled in magnet-embedding holes 22. Magnet-embedding holes 22 holding the inserted permanent magnets 24 that are fixed securely with the resin or adhesive in this manner can integrate the rotor core, permanent magnets 24 and the resin, thereby helping to spread the stresses produced by the centrifugal force. It thus becomes possible to alleviate local concentration of the stresses, make up the strength weakened by the thinning-down of bridge portions 28, and obtain a highly robust rotor.

Figure 5A:
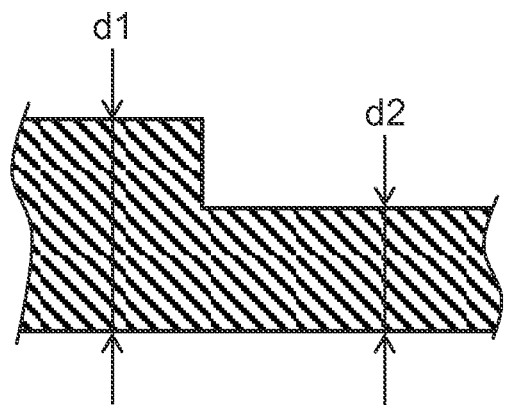
FIG. 5A is an illustration showing one example of a sectional shape of a thinned portion.
Figure 5B:
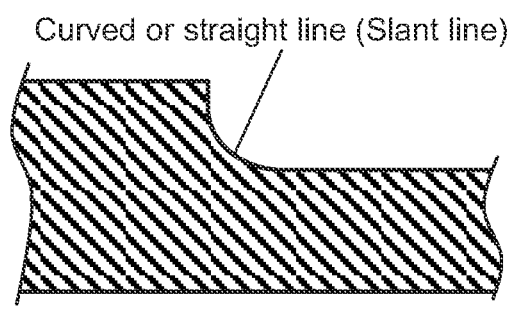
FIG. 5B is an illustration showing another example of a sectional shape of the thinned portion.

FIG. 5A and FIG. 5B show sectional views of the thin iron plate of the rotor (as viewed from the arrow A in FIG. 3). FIG. 5A shows a case in which no slope is provided on a boundary face where the plate thickness of the thin iron plate is changed from thickness d1 before bridge portion 28 is formed (i.e., flattened) to thickness d2 after flattened, and FIG. 5B shows another case in which the boundary face is formed into either a curved line or a straight line having a desired slope.

When the rotor rotates, the stresses produced by the centrifugal force concentrate on the boundaries where the plate thickness changes from thickness d1 before flattened to thickness d2 after flattened in the structure shown in FIG. 5A. When the boundary faces are formed of a curved line or a straight line having a desired slope as shown in FIG. 5B, however, the stresses do not concentrate on certain locations, but they can be spread throughout. In other words, the rotor constructed into a structure such as the one shown in FIG. 5B can improve the strength such that the rotor can rotate at a high speed without becoming damaged.

As described above, the permanent-magnet-embedded electric motor of the present invention is so constructed that plate thicknesses of the bridge portions and the thinned link portion connecting the bridge portions are formed thinner than the thickness of the steel plate. According to the present invention, therefore, magnetic flux leakage of the magnets can be reduced to a smallest possible amount and achieve even higher torque of the electric motor.

INDUSTRIAL APPLICABILITY

The present invention has no specific limitation on the field of use, and it can be used widely, for example, as an electric motor provided with a permanent-magnet-embedded rotor.

What is claimed is:

1. A permanent-magnet-embedded electric motor comprising:
    a stator having a coil wound on a stator core; and
    a rotor disposed rotatably inside the stator via a gap to an inner circumferential surface of the stator core,
    wherein the rotor is provided with:
        a rotor core formed of a plurality of steel plates laminated in an axial direction; and
        a plurality of permanent magnets retained by the rotor core,
    wherein each steel plate includes:
        a plurality of magnet-embedding holes formed at predetermined intervals along a circumferential direction for housing the permanent magnets respectively so that each magnet-embedding hole separates the steel plate into an inner area and an outer area in a radial direction;
        a plurality of link portions, each disposed between two adjoining magnet-embedding holes of the plurality of magnet-embedding holes, having a thinned link portion on a radially outer end, and linking the inner area and the outer area of the steel plate; and
        a plurality of bridge portions, each forming a part of the outer area of the steel plate and connecting to the respective link portion through the thinned link portion,
    wherein the magnet-embedding holes and the link portions are alternately disposed in the circumferential direction,
    wherein an outer circumference of each steel plate is formed of a plurality of combinations of:
        a first curved section; and
        two second curved sections that are positioned on both sides of the first curved section and have a different curvature from the first curved section, each combination facing one magnet-embedding hole in the radial direction,
    wherein each magnet-embedding hole has a sectional shape that includes:
        a magnet-housing space for housing the permanent magnet;
        two first gaps positioned on both sides in the circumferential direction of the magnet-housing space;
        two second gaps formed on both ends at an inner side in the radial direction of the magnet-housing space; and
        two protrusions positioned between one of the first gaps and one of the second gaps on both sides in the circumferential direction of the magnet-housing space,
    wherein each link portion is positioned to be sandwiched between two adjoining first gaps;

each bridge portion is radially sandwiched between the outer circumference of the steel plate and the two adjoining first gaps;
    wherein the permanent magnet is housed in the magnet-embedding hole by positioning so that two radially inner side corners of a sectional surface of the permanent magnet touch the two protrusions respectively,
    wherein a thickness of each of the bridge portions and a thickness of each of the thinned link portions are thinner than a thickness of the steel plates.

2. The permanent-magnet-embedded electric motor of claim 1, wherein a width in a radial direction of each of the thinned link portions is larger than a width in a radial direction of each of the bridge portions.

3. The permanent-magnet-embedded electric motor of claim 1, wherein the thickness denoted by d2 and a width in a radial direction denoted by t1 of the bridge portions have a relationship of d2≤t1.

4. The permanent-magnet-embedded electric motor of claim 3, wherein the thickness of the steel plates denoted by d1 and the width t1 have a relationship of t1≤d1.

5. The permanent-magnet-embedded electric motor of claim 1, wherein the magnet-embedding holes are formed in the steel plates by a punching step carried out after a pressing step of forming the bridge portions.

6. The permanent-magnet-embedded electric motor of claim 1, wherein the steel plates are laminated while being shifted one after another at a rate of any given angle.

7. The permanent-magnet-embedded electric motor of claim 1, wherein the permanent magnets are fixed with resin or adhesive filled in the magnet-embedding holes.

8. The permanent-magnet-embedded electric motor of claim 1, wherein boundary faces of the bridge portions in a direction of the thickness are formed of a curved line or a straight line having a desired slope.

9. A method for manufacturing the permanent-magnet-embedded electric motor as defined in claim 1, the method comprising a step of forming the steel plates having the plurality of magnet-embedding holes, wherein, in the step of forming the steel plates, a punching step of the magnet-embedding holes is provided after a pressing step of forming the bridge portions.

10. The permanent-magnet-embedded electric motor of claim 2, wherein the magnet-embedding holes are formed in the steel plates by a punching step carried out after a pressing step of forming the bridge portions.

11. The permanent-magnet-embedded electric motor of claim 2, wherein the steel plates are laminated while being shifted one after another at a rate of any given angle.

12. The permanent-magnet-embedded electric motor of claim 2, wherein the permanent magnets are fixed with resin or adhesive filled in the magnet-embedding holes.

13. The permanent-magnet-embedded electric motor of claim 2, wherein boundary faces of the bridge portions in a direction of the thickness are formed of a curved line or a straight line having a desired slope.

14. A method for manufacturing the permanent-magnet-embedded electric motor as defined in claim 2, the method comprising a step of forming the steel plates having the plurality of magnet-embedding holes, wherein, in the step of forming the steel plates, a punching step of the magnet-embedding holes is provided after a pressing step of forming the bridge portions.

* * * * *